(No Model.)
M. H. GRAY.
EXPANSION JOINT.
No. 330,392. Patented Nov. 17, 1885.
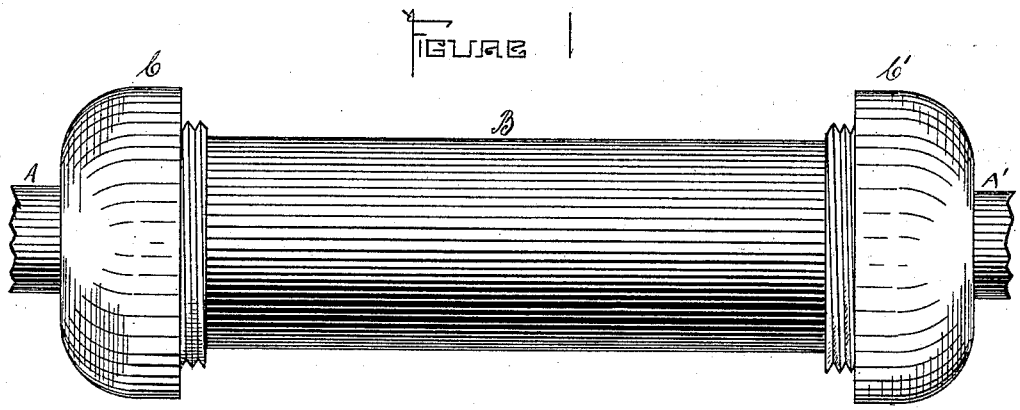
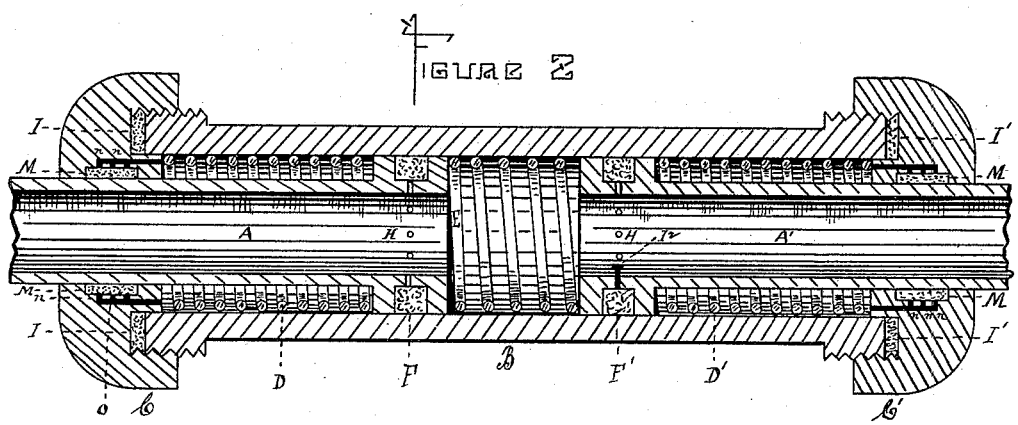
WITNESSES—
Walter Reese
George M. Moore
INVENTOR—
Matthew H. Gray
Per Jacob Reese,
Attorney.

UNITED STATES PATENT OFFICE.

MATTHEW H. GRAY, OF PITTSBURG, PENNSYLVANIA.

EXPANSION-JOINT.

SPECIFICATION forming part of Letters Patent No. 330,392, dated November 17, 1885.

Application filed September 11, 1885. Serial No. 176,768. (No model.)

*To all whom it may concern:*

Be it known that I, MATTHEW H. GRAY, a citizen of the United States, residing in Pittsburg, in the county of Allegheny and State of Pennsylvania, have invented a new and useful Improvement in Expansion Joints; and I hereby declare the following to be a full, clear, and exact description thereof, reference being had to the drawings forming a part of same.

In the utilization of natural gas, long lines of pipe are used for conveying the gas from the wells to the place or places where it is used. The pipes are made of cast or wrought iron, which expands and contracts with every change of temperature, and, although the pipes are laid from three to four feet below the surface, the expansion and contraction is so great as to break the joints or pipes unless expansion-joints are used. The gas comes from the earth ordinarily at a pressure varying from two to five hundred pounds to the square inch, so that the old expansion-joints will leak, and are impractical for use on natural-gas mains. When the connections are made with bolts, the expansion of the bolts is sufficient to cause a leak. The difficulty of leakage is more especially confined to the moving parts. The packing is loosened by the slip.

My invention consists, first, in utilizing the internal pressure in packing the joints of pipes.

My invention also consists in utilizing the internal gas-pressure in packing the movable parts of an expansion-joint of a gas-pipe.

My invention also consists in the peculiar construction of my improved expansion-joint for gas-pipes.

Figure 1 is a plan view of my improved expansion-joint. Fig. 2 is a cross-sectional view of same.

The expansion-joint may be made of cast-iron or any other suitable metal; but I prefer to make the barrel B and the caps C and C' of brass, in order that the moving parts may not rust and thus stick together.

In constructing my improved expansion-joint I form the abutting ends of the main pipe with two collars and an intermediate groove as shown in A and A'. Small holes are drilled through the base of these grooves into the pipe, as shown at H. These holes are then closed by a loose-fitting wooden plug, $1^2$, and lead or Babbitt metal, or any other suitable material, cast around and filling the groove over full. The pipes A and A' are then put into the lathe and turned to the proper size. The barrel B should be carefully bored out to make a snug fit with end of pipes A and A'. A spiral spring, E, whose outside diameter is equal to the inside diameter of the barrel B, is then inserted in it, after which the ends of pipes A and A' are put into the barrel. Spiral springs D and D' are then put on pipes A and A'. The caps C and C' are provided with an internal thread, to correspond to an external thread on the ends of the barrel. The caps are also provided with a gasket, I and I', which may be of rubber, lead, or any suitable substance. The caps are bored out to fit the pipes A and A'. The bore is then grooved out, as at M, and small holes $n\,n\,n$ bored about one inch deep at the base of the groove. Then a hole, $o$, is bored parallel with the bore of the groove, so as to intercept the other holes, $n\,n\,n$. The caps C C' are then passed over the pipes A and A' and screwed onto the ends of the barrel, when the expansion-joint is ready for use.

In all expansion-joints heretofore made the friction of the moving parts is continuously in proportion to the highest pressure, consequently the friction will not vary with the pressure in the same joint, which is excessive in natural-gas expansion-joints. Now, to overcome this friction and enable the expansion-joint to assume its normal position, when relieved from expansion or contraction, I use the pressure of the gas to push and pack the gasket tightly around the joint, so that the friction will vary with the varying pressure of gas in the pipe. I have also provided it with the springs E, D, and D', which operate as follows: When the pipes contract, A and A' are drawn out and springs D and D' are compressed and spring E is extended. When the contraction ceases, the springs D and D' draw the pipes in to their normal position, and when expansion takes place the pipes are forced in and compress spring E, and when the expansion ceases the spring E will force the pipes A and A' out to their normal position, so that the springs assist in overcoming the friction and insure a quick movement at the instant the force is diminished. When the pressure is in the pipe, the gas passes through the ports H and presses against the inside of the gaskets F and forces them out against the barrel, and thus make a gas-tight joint. Should, however, any gas escape beyond the gaskets F into the chambers where the springs are, it will pass through $o$ and $n\,n\,n$ and press the gasket M close against the pipes A and A'. It will also be intercepted and prevented from passing out through the screw by the gasket I.

By this apparatus the differential expansion of the barrel and the pipes is compensated by the internal pressure forcing the gasket out.

What I claim, and desire to secure by Letters Patent, is—

1. The combination, with the barrel having the caps, of the pipes having the collars, the spring E, arranged between the pipes, and the springs D D' on the pipes, said springs bearing against the caps at one end and against the collars at their other ends, as set forth.

2. A pipe-joint which consists in a pipe having a groove in one end, the groove being filled with lead or other suitable material, and having openings from the base of the lead gasket to the inside of the pipe, in combination with the bowl end of another pipe, constructed and arranged so that the internal pressure shall force the gasket against the bowl, substantially as and for the purpose set forth.

3. The combination, with the barrel and the pipes A A', having the gaskets F, of the caps C C', having the gaskets M M, and the ports $n$ and $o$, substantially as set forth.

4. The combination, with the barrel, the caps having the gaskets, and the pipes A A', having the gaskets F, of the springs D, D', and E, substantially as set forth.

5. The caps C and C', having gaskets M M', in combination with ports $o$ and $n\,n\,n$.

6. The combination of pipes A and A', barrel B, caps C and C', with springs D, D,' and E.

7. The combination, with the barrel having the caps at its ends, and the gaskets M, of the pipes having the collars at their inner ends, said collars being formed with circumferential grooves and gaskets therein, the springs on the pipes, said springs bearing against the caps at one end and against the collars at their other ends, and the spring between the inner ends of the pipes, as set forth.

8. The combination, with the barrel having the caps and the gaskets I, I', and M, of the pipes A A', having the collars formed with grooves and gaskets therein, and having the ports H, the spring E between the pipes, and the springs D D', substantially as set forth.

9. The combination, with the barrel and the pipes having the collars formed with grooves, and gaskets fitted therein, and also having the ports H, of the caps C C', the gaskets I, I', and M, and the ports $n\,o$, as set forth.

MATTHEW H. GRAY.

Witnesses:
C. C. LEE,
W. S. REESE.